Patented Oct. 24, 1950

2,527,230

UNITED STATES PATENT OFFICE 2,527,230

METHOD OF CRYSTAL FORMATION AND PRECIPITATION

Vincent J. Schaefer, Schenectady, and Bernard Vonnegut, Alplaus, N. Y., assignors to General Electric Company, a corporation of New York No Drawing. Application January 21, 1948, Serial No. 3,544

8 Claims. (Cl. 299—28)

This application is a continuation-in-part of our earlier application Serial No. 725,156, filed January 29, 1947, and later abandoned.

The present invention comprises a process whereby crystallization in whole or in part is caused in supersaturated vapor-containing gases and supercooled liquids. It relates in particular to the development of ice crystals in aerosols comprising supercooled water droplets, as, for example, supercooled natural atmospheric clouds in which snow crystals do not form even though the clouds have assumed a temperature below 0° C. and even as low as −35° C. or lower, for example, −38° C.

As a consequence of our invention, crystallization may be effected in supercooled liquids, or in gases containing a vapor which is supersaturated with respect to the solid state. For example, by means of our invention, ice crystals may be formed in a supercooled cloud or in an air mass supersaturated with regard to ice, or in supercooled liquids.

In accordance with our invention, foreign nuclei of definite crystalline structure are brought into contact with the supercooled or supersaturated component, e. g., supercooled liquids, supersaturated vapors, etc., which preferably should be at a temperature several degrees below the temperature at which the gaseous or liquid phase is in equilibrium with the solid phase. For example, in the case of supercooled water, e. g., supercooled water droplets, the temperature of the said supercooled water should preferably be at least as cold as about −4° C. or lower. The foreign nuclei which are introduced should have a space group and unit cell dimension similar to the solid form of the liquid or vapor which it is desired to crystallize.

For example, we have found that crystallization in whole or in part of a mass comprising supercooled droplets of water can be effected by the introduction of minute particles of silver iodide at a temperature of about −4° C. and below. In this case, the particle size of the silver iodide is of the range of from about 1 to 1000 microns. Smaller sizes of the silver iodide crystals are also effective for causing crystallization at temperatures below −4° C.

Thus, particles of silver iodide as small as 0.01 micron may advantageously be employed. In this smaller size range, it appears that the temperature at which these particles become active centers for crystallization is somewhat lower, for example, about −8° C., than that at which the larger crystals of silver iodide will cause formation of ice crystals.

The foreign nuclei which are introduced into supersaturated air containing water vapor or clouds made up of minute droplets of supercooled water for the purpose of initiating crystallization preferably have a hemimorphic hexagonal crystalline structure similar to that of ice crystals. In particular, finely divided silver iodide and finely divided wurtzite (ZnS) have been found to be effective for this purpose. Various other minerals having the aforementioned crystalline structure may be similarly employed in a finely divided state to initiate crystallization, namely, zincite (ZnO), nephelite (NaAlSiO$_4$) and apatite [Ca(FCl)Ca$_4$(PO$_4$)$_3$].

One effective method of introducing silver iodide nuclei comprises feeding a string of combustible material, e. g., cotton, coated with silver iodide into a high temperature flame, for example, an oxyhydrogen torch. Simultaneously, a jet of compressed air is blown over the flame, without, however, extinguishing it, thereby cooling and diluting the gas containing volatilized silver iodide and resulting in the dispersion of extremely small silver iodide particles, e. g., as low as 0.01 micron in size, or smaller, in the aforementioned crystalline form.

We have found that the introduction of foreign nuclei of the designated crystalline structure, for example, silver iodide particles, may be varied. Thus, we have introduced silver iodide crystals directly into an atmosphere supersaturated with water vapor with respect to ice, thereby causing precipitation of the water as ice crystals. In another instance, we have found it useful to generate smokes comprising minute particles of silver iodide and introducing these smokes into the atmosphere outside the supersaturated region, whereby in the course of time these foreign nuclei eventually find their way into supersaturated atmospheres by virtue of natural mixing caused by movement of the atmosphere.

The present invention of causing the formation of crystals by the introduction of foreign nuclei possesses definite advantages over a process of introducing seed crystals of the component to be crystallized, e. g., ice crystals in the case of supercooled water. Sources of minute foreign nuclei suitable for causing crystallization can be stored and introduced under conditions adverse to the storage and introduction of crystals of the component to be crystallized. For example, if it should be desired to produce crystallization of a supercooled atmospheric cloud, it is possible to introduce foreign crystallization nuclei, such as herein enumerated under conditions at which ice cannot exist. Silver iodide particles, for example, if introduced into the atmosphere, will become widely distributed and will be available to cause ice precipitation when they come into contact with supercooled clouds or regions supersaturated with water vapor with respect to ice.

When this invention is employed in connection with naturally occurring clouds in the sky, the greatest numbers of crystallization centers are initiated in the vapor phase of the said clouds. This initiation of crystallization can also take place in regions comparatively free of supercooled water droplets where there exist essentially only vapors supersaturated with respect to ice.

It will, of course, be apparent to those skilled in art that in the case of introducing foreign nuclei of the designated crystalline structure into or within the neighborhood of naturally occurring clouds of supercooled droplets, the type of precipitation which reaches the ground will depend on the temperature conditions existing below the cloud. Thus, warm temperatures are conducive to the formation of rain while temperatures closer to the freezing point of water are conducive to the maintenance of the original snow crystalline state, and thus there is obtained a fall of snow to the ground, with the crystals comprising the snow being identical in configuration and latticework to the crystals produced by nature itself.

By the practice of our invention it has been found possible to disperse and precipitate supercooled clouds. For example, dangerous icing conditions adjacent airports and airplane routes can, in many cases, be satisfactorily removed. In addition, weather conditions over certain areas may be controlled by causing these foreign nuclei to mix with or to be injected into naturally occurring clouds, thereby precipitating the supercooled droplets either in the form of snow or rain depending on the temperature conditions existing below the clouds. Furthermore, territorial visibility which is obscured from the air by cloud formations may be improved by causing precipitation of the obscuring clouds in whole or in part. By means of our invention, the harmful effects of hail storms can be ameliorated or eliminated by injecting silver iodide particles into cloud formations thus increasing the number of potential hail nuclei.

In a copending application Serial No. 3,545, filed concurrently herewith by Vincent J. Schaefer, the said application being a continuation-in-part of his earlier application Serial No. 725,155, filed January 29, 1947, and later abandoned, are described other means whereby crystallization in supersaturated atmospheres or in supercooled aerosols may be caused to take place. Included in such means is the introduction of various cooling means capable of reducing the temperature of portions of the supercooled or supersaturated media, for example, particles of solid carbon dioxide, liquid carbon dioxide, liquid oxygen, etc.

What we claim as new and desire to secure by Letters Patent of the United States is:

1. The method of causing crystal formation in a mass having a temperature below $-4°$ C. and being selected from the class consisting of supercooled water droplets and water vapor supersaturated with respect to ice, which method comprises introducing into said mass crystals of a material foreign with respect to said mass and having a space group and unit cell dimensions closely approximating that of the solid form of said mass.

2. The method of causing crystal formation in a mass having a temperature below $-4°$ C. and comprising supercooled droplets of water, which method comprises introducing into said mass foreign solid particles having a hemimorphic hexagonal crystalline structure, thereby causing crystallization of the water in the aforementioned droplets.

3. The method of causing crystal formation in a mass having a temperature below $-4°$ C. and comprising supercooled droplets of water, which method comprises introducing into said mass minute particles of silver iodide, thereby causing crystallization of the water in the aforementioned droplets.

4. The method of causing crystal formation in a gas having a temperature below $-4°$ C. and comprising water vapor supersaturated with respect to ice, which method comprises introducing into the said gas crystals of silver iodide, thereby causing crystallization of the vapor in the aforementioned gas.

5. The method of causing ice crystal formation in a natural atmospheric cloud which is supercooled to a temperature below $-4°$ C., which method comprises introducing into the said cloud foreign solid particles having a hemimorphic hexagonal crystalline structure, thereby causing the formation of minute ice crystals.

6. The method of causing crystal formation in a mass having a temperature below $-4°$ C. and comprising supercooled droplets of water, which method comprises introducing into said mass particles of zinc sulfide, thereby causing crystallization of the water in the aforementioned droplets.

7. The method of producing rain from a natural atmospheric cloud which is supercooled to a temperature below $-4°$ C. and which comprises a mass of supercooled water droplets suspended in air over an area having a temperature at least equal to that required to melt snow crystals, which method comprises introducing into the said cloud particles of silver iodide whereby myriads of ice crystals are formed and are precipitated as rain upon falling into the atmosphere underneath said cloud.

8. The method of causing ice crystal formation in a natural atmospheric cloud which is supercooled to a temperature below $-4°$ C., which method comprises introducing into the said cloud foreign solid particles comprising crystals of silver iodide, thereby causing the formation of minute ice crystals.

VINCENT J. SCHAEFER.
BERNARD VONNEGUT.

REFERENCES CITED

The following references are of record in the file of this patent:

UNITED STATES PATENTS

| Number | Name | Date |
|---|---|---|
| 1,512,783 | Miller | Oct. 21, 1924 |
| 2,068,987 | King, Jr. | Jan. 26, 1937 |
| 2,160,900 | Pleasants | June 6, 1939 |
| 2,232,728 | Pleasants | Feb. 25, 1941 |

OTHER REFERENCES

Page 736 of Arny's Principles of Pharmacy (Third Edition), published by W. B. Saunders Company, Philadelphia, Pa., U. S. A. and London. (Copy in Div. 46.)